United States Patent [19]

Masuda et al.

[11] Patent Number: 4,939,537
[45] Date of Patent: Jul. 3, 1990

[54] EXPOSURE CONTROLLING APPARATUS

[75] Inventors: Keiji Masuda; Fumiaki Hiraike, both of Hachioji, Japan

[73] Assignee: Konishiroku Photo Industry Co., Ltd., Tokyo, Japan

[21] Appl. No.: 418,711

[22] Filed: Oct. 3, 1989

Related U.S. Application Data

[63] Continuation of Ser. No. 201,303, May 26, 1988, abandoned, which is a continuation of Ser. No. 925,228, Oct. 31, 1986, abandoned.

[30] Foreign Application Priority Data

Nov. 5, 1985 [JP]   Japan .................. 60-246271

[51] Int. Cl.⁵ .................. G03B 27/72; G03B 27/76
[52] U.S. Cl. ............................ 355/35; 355/71
[58] Field of Search .................. 355/35, 67, 71

[56] References Cited

U.S. PATENT DOCUMENTS

| | | | |
|---|---|---|---|
| 3,260,152 | 7/1966 | Aston ................. | 355/35 |
| 3,299,773 | 1/1967 | Jasny ................. | 355/35 |
| 4,189,227 | 2/1980 | Barbieri ............. | 355/35 |
| 4,191,466 | 3/1980 | Gandini .............. | 355/35 |
| 4,319,834 | 3/1982 | Terrill ............... | 355/35 |
| 4,368,974 | 1/1983 | Coote et al. ........ | 355/35 |
| 4,375,918 | 3/1983 | Isono et al. ........ | 355/35 |

Primary Examiner—Monroe H. Hayes
Attorney, Agent, or Firm—Jordan B. Bierman

[57] ABSTRACT

A color copying machine for copying an image on a photosensitive material having a movable scanning exposure element with a light source for irradiating a document to be copied and projecting light reflected from the document through a window. At most, two of three primary color filters correct the spectral intensity of the light by being inserted into the light path in both directions perpendicular to the direction in which the photosensitive material is conveyed. The ratio of the total area of a sectional plane of the light path to the area of the sectional plane covered by the color correction filter is adjusted to obtain the required spectral intensity. At least one diaphragm in the light path regulates the sectional plane of the light path whereby the controlled diaphragm does not cause a change in the adjusted ratio, and the amount of light is regulated without changing the corrected spectral intensity thereof.

9 Claims, 4 Drawing Sheets

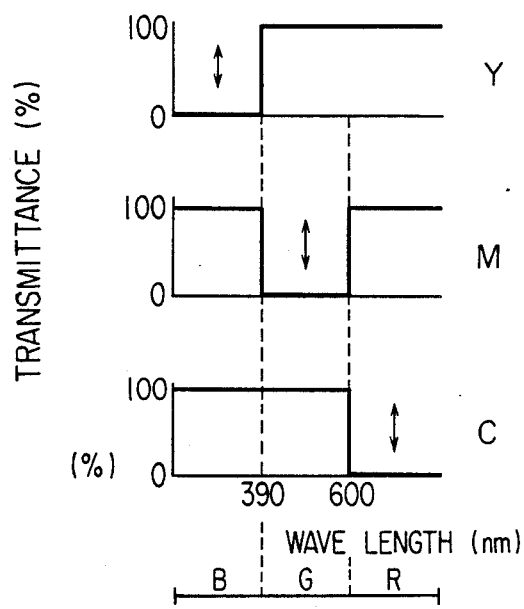

EXPOSURE CONTROLLING APPARATUS

This application is a continuation of application Ser. No. 201,303, filed May 26, 1988 now abandoned which is a continuation of application Ser. No. 925,228 filed Oct. 31, 1986, now abandoned.

FIELD OF THE INVENTION

The present invention relates to an exposure controlling apparatus suitable for use in a color copying machine.

BACKGROUND OF THE INVENTION

A color image copying process in which beams of light carrying the image information of a color original are applied on a color photo sensitive material so as to expose the material and then the material is developed and fixed by the processing section of a copying machine is known in the art.

In the copying machine of this type, it is required that the color of the light carrying an image information can be corrected according to the spectral-sensitivity characteristic of the color sensitive material, that the hue of the exposed light can be adjusted in correspondence to the color tone of the original and further that the light can be actively adjusted to a desired hue.

In order to control the hue of the exposed light, a method is employed in which three-color correction filters are inserted midway in an optical path for the image carrying light and the amounts of insertion of the correction filters (the ratios of insertion) are controlled.

As such three-color correction filters, those which can shield the wavelength of light of specific hue are used. More concretely, a yellow filter which is capable of shielding blue light, a magenta filter which is capable of shielding green light and a cyan filter which is capable of shielding red light are used. In this case, an exposure control by the two kinds of filters is considered in view of the easiness of control and the loss of the amount of light due to shielding of light by the filter. But since the amount of light varies depending on the amount of insertion of each filter into the optical path, there is often a case in which a complete color adjustment is difficult because loss of light due to the degree of insertion of the filter is not compensated in an appropriate manner.

SUMMARY OF THE INVENTION

The object of the present invention is to provide an exposure controlling apparatus which makes it possible to obtain a proper amount of light while using color correction filters so that a complete color adjustment can be performed.

To attain the above object, the exposure control apparatus according to the present invention is of the type which performs color adjustments by inserting into the optical path two of three-color correction filters at the maximum and which has a program capable of controlling the adjustment of a diaphragm according to the variation of the degree of exposure due to insertion of the filter.

BRIEF DESCRIPTION OF THE DRAWINGS

FIG. 6 is a view showing light transmitting characteristics of three kinds of Y, M and C filters;

FIG. 7 is an illustrative view showing a hue adjusting section and a diaphragm adjusting section of a console;

DETAILED DESCRIPTION OF THE INVENTION

One embodiment of the present invention will now be described herein-below.

Figure 1:
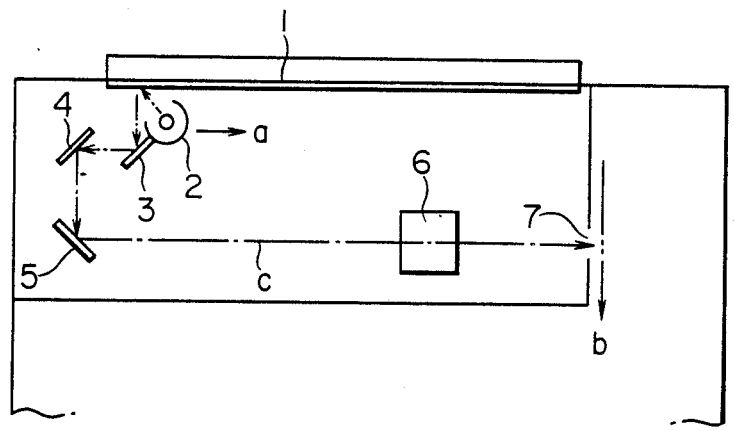
FIG. 1 is an illustrative view of an exposure-scanning portion of one embodiment of a color copying machine according to the present invention.

In FIG. 1 a color original (not shown) placed on a platen glass 1 is exposed and scanned by a light source 2 which is movable at a constant speed in the direction of the arrow "a" and the light of the light source reflected from the color copy moves through a mirror 3 integral with the light source 2, a pair of mirrors 4 and 5 movable at a rate half the speed of the light source in the same direction as the light source and a lens system 6 provided with a lens, filters and a diaphragm and becomes incident upon an exposure window 7.

At the same time, a color sensitive material moves in the direction of the arrow "b" in synchronism with the movement of the light source 2 and in the course of its movement, the color sensitive material is exposed to light through the exposure window in sequence.

Accordingly, if the color sensitive material exposed in the above process is fed to processing sections for color development, fixation, bleaching and drying, it will be possible to obtain a color copying image corresponding to the color copy.

Figure 2:
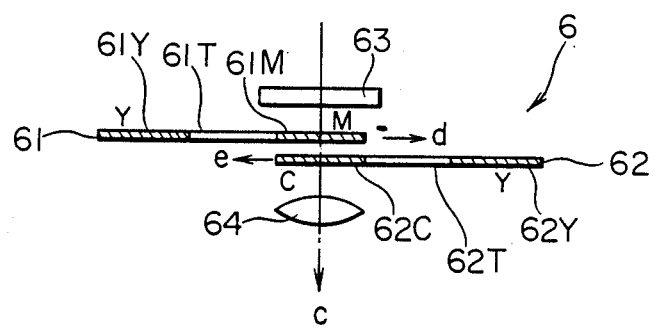
FIG. 2 is a detailed illustrative view of a portion of a lens system shown in FIG. 1.

FIG. 2 shows the above-mentioned lens system 6 in detail. As shown, a first filter board 61, a second filter board 62, a diaphragm 63 and a lens 64 are arranged along an optical path "c".

Figure 3:
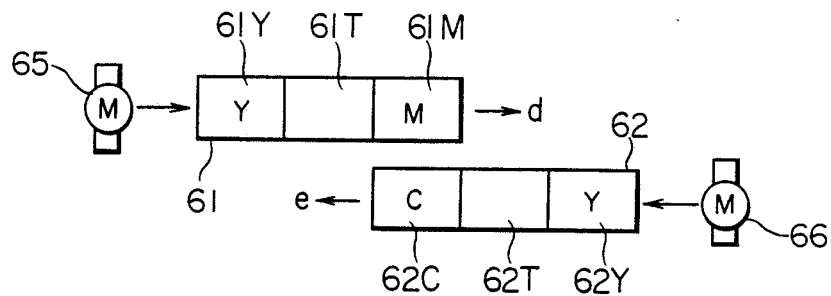
FIG. 3 is a view illustrating the manner of driving filter boards.

As shown in FIG. 3, the first filter board 61 includes therein a yellow (hereinafter referred to as "Y") filter 61Y and a magenta (hereinafter referred to as "M") filter 61M which are arranged on both sides, respectively, of the board and a transparent section 61T at the center thereof.

Further, the second filter plate 62 includes therein a yellow filter 62Y and a cyan (hereinafter referred to as "C") filter 62C which are arranged on both sides, respectively, and a transparent section 62T at the center thereof.

The two filter boards 61 and 62 originally assume positions, respectively, where the center of the filter 61M and that of the filter 62C are in coincidence with an optical axis C and are made movable in opposite directions designated by the arrows "d" and "e" (the right and left directions crossing the optical path "c") by means of stepping motors 65 and 66.

Therefore, it is possible to realize the following states by properly controlling the steppinq motors 65 and 66:
(1) No insertion of filters . . . No correction of hue
(2) The amount of insertion of one of the Y, M and C filters is in the order of 0~100% . . . Correction of one kind of hue and chroma (3) Insertion of combinations of two of the Y, M and C filters, that is, a combination of the Y and M filters with the amount of insertion of each filter being in the order of 0~100%, a combination of the M and C filters with the amount of insertion of each filter being in the order of 0~100% and a combination of the C and Y filters with the amount of each filter being in the order of 0~100%.

Figure 4:
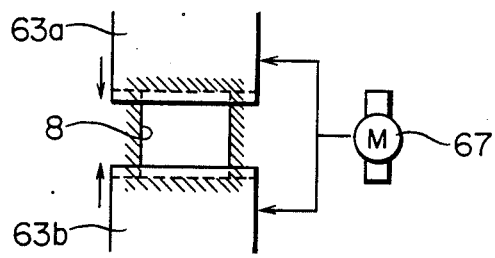
FIG. 4 is a cross-section of the exposure control diaphragm mechanism.
Figure 5:
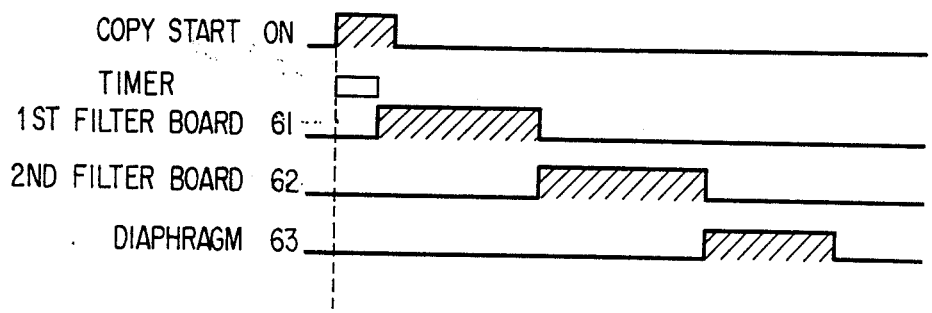
FIG. 5 is a timing chart showing the timing between the filter boards and the operation of a diaphragm.

As shown in FIG. 4, a diaphragm 63 comprises a couple diaphragm pieces 63a and 63b which confront each other from the upper and lower portions (in the direction vertically crossing the optical path "c") of a window 8 corresponding to the exposure window 7 in the optical path "c" and are made controllable so as to come close to, and leave away from, each other through a stepping motor 67. The original positions of the diaphragm pieces 63a and 63b are shown by the dotted line at which the window 8 opens to the full.

In a preferred embodiment of the invention, when the copy start switch is turned to the on position, the controlling means automatically calculates which filters are required, the amount of insertion thereof, and the amount of diaphragming necessary. Said calculations are performed during a timer time $T_o$. In response to said calculations, the first filter board 61 is inserted, the second filter board 62 is inserted, and diaphragming is adjusted, in sequence. After completion of the diaphraghing operation, white source 2 begins the exposure scanning operation.

Next, a method of preparing a color filter control program will be described. FIG. 6 shows the light transmitting characteristics of the Y, M and C filters. As will be clear from the figure, the intensity (the amount of light) of blue color (B) is reverse proportional to the amount of insertion of the Y filter, that of green color (G) is reverse proportional to the amount of insertion of the M filter and that of red color (R) is reverse proportional to the amount of insertion of the C filter.

Now, in the instant embodiment, a hue adjusting section is provided on the console so that the color of each of the Y, M and C filters can be changed in nine (9) stages.

Further, as regards color density, a density adjusting section is also provided on the console so that the color density can be adjusted in five (5) stages from $-2 \sim +2$.

The color $CL_o$ obtained by the filters 61 and 62 can be expressed by the equation of:

$$CL_o = a_o Y + b_o M + C_o C \tag{1}$$

Wherein
$a_o$: F value of the Y filter
$b_o$: F value of the M filter
$c_o$: F value of the C filter with the F value designating the amount of insertion of each filter. The F value is determined in advance according to the spectral-sensitivity characteristic of each color of a color sensitive material to be used and the hue of the color is regarded as a preset value.

As mentioned hereinabove, two of the three kinds of filters are used in the instant embodiment and it is necessary to substitute the remaining filter for the other two. For this purpose, the filter whose F value is the smallest (one that is inserted in the smallest amount) is substituted for the other two. For example, if $a_o < b_o < c_o$, the equation (1) will be changed to:

$$\begin{aligned} CL_o &= -a_o(M+C) - b_o M + c_o C \\ &= (b_o - a_o) M + (c_o - a_o) C. \end{aligned} \tag{2}$$

Therefore, the hues of the M and C filters are adjusted and the adjusted hues represent the actual preset values of the filters corresponding to the color sensitive material to be used.

Thus the color correction for the color sensitive material by the filters is performed in correspondence to the r-characteristic of the color sensitive material to each light spectrum but when it is desired to further correct the color artificially, hue correcting buttons and density adjusting buttons shown in FIG. 7 may be operated.

Regarding the filters, the hue CL to be obtained in this case will be:

$$CL = (a_o + a)Y + (b_o + b)M + (c_o + c)C$$

Wherein
a: F value determined by a Y button
b: F value determined by a M button
c: F value determined by a C button.

In this case, too, in order to obtain the hue CL by the above-mentioned two filters, the filter whose F value is the smallest is substituted for the remaining two kinds of filters. For example, if $(a_o + a) < (b_o + b) < (c_o + c)$, then the following equation will result:

$$CL = -(a_o + a)(M+C) + (b_o + b)M + (c_o + c)C(b_o + b - a_o - a)M + (c_o + C - a_o + a)C \tag{3}$$

wherein $(b_o + b - a_o - a)$ is the F value of the C filter.
In this case, the stop d will be:

$$d = d_o + \underline{(a_o + a)}$$

and the underlined portion becomes a coefficient due to color correction. Further, $d_o$ designates a stop value determined by the density adjusting buttons.

Therefore, in the case of further adjusting the stop by the density adjusting buttons, $$d = d' + d_o + \underline{(a_o - a)}$$

will result wherein d' designates the amount of correction by the re-operations of the buttons.

Figure 8:
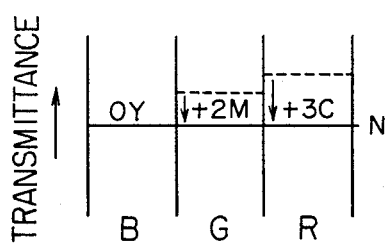
FIGS. 8(a) through (e) are hue characteristic charts illustrating the manner of color correction.
Figure 8:
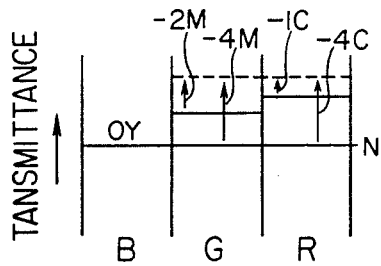
Figure 8:
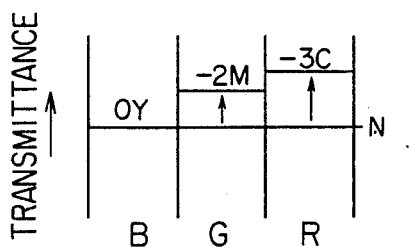
Figure 8:
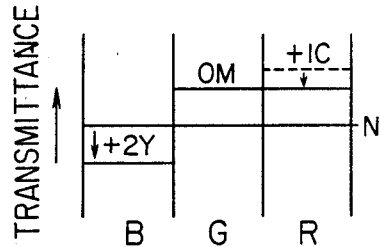
Figure 8:
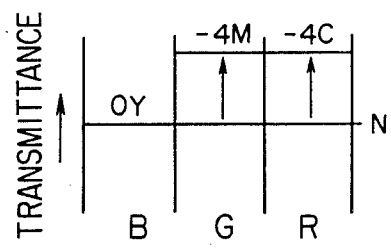

The computation of the above program is carried out by a microcomputer incorporated in the copying machine and the contents of the above description will be concretely illustrated with reference to FIG. 8.

Now, assume that the M filter and the C filter be inserted into the optical path to degrees of $-2$ and $+3$, respectively, and each of the colors BGR be N (neutral) with respect to the spectral-sensitivity characteristic of the color sensitive material. (See FIG. 8(a)). Then such neutral state is automatically set by the inputting of the spectral-sensitivity characteristic of the color sensitive material.

For example, a marking indicating the spectral-sensitivity characteristic of the color sensitive material is applied in advance to a vessel containing the color sensitive material and the spectral-sensitivity characteristic of the material is detected by a sensor provided in the vessel so that the intensities of the colors BGR are determined by predetermined tabulated values and in the instant embodiment, the amounts of insertion of the M and C filters are determined to coincide with these values.

As a result, both of the M and C filters are automatically moved to take their F values specified when the +2- and +3-buttons of the color correcting section shown in FIG. 7 are operated and then the F values are caused to correspond to the O-button of the hue adjusting section. The hue $CL_1$ in this case will be:

$$CL_1 = O\ Y + 2\ M + 3\ C \qquad (4).$$

Then, in order to artificially correct this hue at the hue adjusting section shown in FIG. 7, when the −2-button of the M filter and the −3-button of the C filter are operated, the characteristic shown in FIG. 8(b) is obtained and a state in which all the filters are removed from the optical path. That is, the hue $CL_2$ in that case will be:

$$CL_2 = O\ Y - 2\ M - 3\ C \qquad (5).$$

Next, when the −4-button of the M filter and the −4-button of the C filter are operated, the characteristic shown by the broken line in FIG. 8(c) must result but since both the M and C filters have already been removed, the characteristic shown by the solid line will result.

Therefore, the target hue $CL_3$ in this case will be:

$$CL_3 = O\ Y - 4\ M - 4C \qquad (6)$$

and so the difference between the hue characteristics shown in FIGS. 8(b) and (c), that is, $CL_3 - CL_2$ (Equation (6)−Equation (5)) will be:

$$CL_3 - CL_2 = -2M - 1C \qquad (7).$$

In this case, as the smallest coefficient is −2, if the two kinds of filters other than the M filter having such smallest coefficient are selected, then $$CL_3 - CL_2 = +2(Y+C) - 1C = 2Y + 1C \qquad (8)$$

will result which shows a hue characteristic based on the amount of light obtained with the currently inserted M filter.

Therefore, when the filter plates 61 and 62 are controlled by computing the above equation, the characteristic shown in FIG. 8(d) which coincides with the above equation can be obtained. However, according to this characteristic, the amount of light of the blue color B is not more than the neutral so that the amount of light becomes insufficient for the color sensitive material.

Therefore, the diaphragm 63 is opened to increase the amount of light by a degree corresponding to the coefficient (−2) which is realized by removing the two-stage filters, thereby obtaining the characteristic shown in FIG. 8(e) which indicates the hue $CL_3$ expressed by the above equation (6).

As described above, according to the present invention, the correction of hue is performed by using two of three primary color filters so that the amount of light corresponding to the two kinds of filters can be reduced at the maximum and the loss of light can be minimized. Further, in case a shortage of the amount of light is unavoidable even by the use of two kinds of filters, it is possible to compensate for the shortage by adjusting the degree of stopping.

What is claimed is:

1. A color copying machine for copying an image on a photosensitive material, said machine comprising;
   a scanning exposure means having a light source for irradiating a document to be copied and projecting light reflected from said document through a window,
   said window confining a sectional plane of a light path so that a path of said photosensitive material corresponding to the sectional plane of said light path is exposed with light passing through said window,
   said scanning exposure means scanning the overall document;
   a conveying means for conveying the photosensitive material in a predetermined direction in synchronization with the scanning of said scanning exposure means so as to expose said photosensitive material to an overall image of said document,
   a filter means for correcting the spectral intensity of light by inserting, at most, two of three primary color correction filters in said light path in a direction transverse to the said predetermined direction wherein the area ratio of the total area of said sectional plane of said light path and the area of the sectional plane covered by said color correction filter is adjusted to obtain the required spectral intensity; and
   a means for regulating the sectional plane of said light path by inserting at least one diaphragm in said light path in said predetermined direction whereby the controlled diaphragm does not cause a change in the adjusted ratio, so that the amount of light is regulated without changing the corrected spectral intensity thereof.

2. The exposure controlling apparatus of claim 1, wherein said color correction filter consists of yellow, magenta and cyan filters.

3. The exposure controlling apparatus of claim 1, wherein said color correction filter consists of blue, green and red filters.

4. The exposure controlling apparatus of claim 1, wherein said filter means comprises two sets of filter boards including therein two of three color correction filters.

5. The exposure controlling apparatus of claim 1, wherein said apparatus comprises a memory means in which information of a light-sensitive material to be used is stored.

6. The exposure controlling apparatus of claim 5, wherein said apparatus comprises a means for adjusting said filter means and/or said diaphragm in response to the information from the memory means.

7. The apparatus of claim 1 wherein said sectional plane is rectangularly shaped, said color correction filters are adapted for movement into and out of said light path in a first side to side direction, said diaphragm having edges movable toward and away from each other in a second direction substantially perpendicular to said first direction, said edges being substantially parallel to each other.

8. The copy machine of claim 1 further comprising a memory means for storing spectral sensitivity information of said color sensitive materials, and means for adjusting said filter means and/or a stop means for regulating the amount of light in response to said information.

9. The machine of claim 8 wherein the area of said sectional plane is rectangular, said color correction filters are adapted for movement into and out of said light path in a first side to side direction, said diaphragm having edges movable toward and away from each other in a second direction substantially perpendicular to said first direction, said edges being substantially parallel to each other.

* * * * *